United States Patent
Davis et al.

(10) Patent No.: US 12,398,974 B2
(45) Date of Patent: *Aug. 26, 2025

(54) TOY PROJECTILE SHOOTER FIRING MODE ASSEMBLY AND SYSTEM

(71) Applicant: Go Play, Holdings Inc., Austin, TX (US)

(72) Inventors: Eric Davis, Austin, TX (US); Colin Guinn, Austin, TX (US)

(73) Assignee: GO PLAY, HOLDINGS INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,110

(22) Filed: May 22, 2024

(65) Prior Publication Data

US 2024/0310141 A1    Sep. 19, 2024

Related U.S. Application Data

(63) Continuation of application No. 18/222,157, filed on Jul. 14, 2023, now Pat. No. 11,994,358, which is a continuation-in-part of application No. 18/218,335, filed on Jul. 5, 2023, now Pat. No. 11,986,739, which is a continuation-in-part of application No. 18/095,911, filed on Jan. 11, 2023, now Pat. No. 11,813,537, which is a continuation-in-part of
(Continued)

(51) Int. Cl.
*F41B 11/643*    (2013.01)
*F41B 11/52*    (2013.01)
*F41B 11/71*    (2013.01)
*F41B 11/89*    (2013.01)

(52) U.S. Cl.
CPC ............ *F41B 11/643* (2013.01); *F41B 11/52* (2013.01); *F41B 11/71* (2013.01); *F41B 11/89* (2013.01)

(58) Field of Classification Search
None
See application file for complete search history.

(56) References Cited

U.S. PATENT DOCUMENTS 4,441,576 A * 4/1984 Allen ...................... A61F 11/14
                                                  381/372
6,062,208 A * 5/2000 Seefeldt .................. F41B 11/00
                                                  42/1.03
(Continued)

*Primary Examiner* — Jason A Pringle-Parker
(74) *Attorney, Agent, or Firm* — Jeffer Mangels; Butler & Mitchell LLP; Brennan C. Swain, Esq.

(57) ABSTRACT

A toy projectile shooter that includes a housing defining a housing interior, a barrel, a trigger movable between a firing position and a non-firing position, a firing motor, a plunger sensor, a plunger disposed in the housing interior, and a shot firing mode system configured to activate the firing motor when the trigger is moved from the non-firing position to the firing position, move the plunger from a first plunger position to a second plunger position when the firing motor is activated, actuate the plunger sensor when the plunger is moved from the first plunger position to the second plunger position, bias the plunger from the second plunger position to the first plunger position after the plunger sensor is actuated, and deactivate the firing motor after the plunger sensor has been actuated a predetermined number of times.

12 Claims, 8 Drawing Sheets

Related U.S. Application Data application No. 17/862,001, filed on Jul. 11, 2022, now Pat. No. 11,759,717.

(60) Provisional application No. 63/522,368, filed on Jun. 21, 2023, provisional application No. 63/409,582, filed on Sep. 23, 2022, provisional application No. 63/220,343, filed on Jul. 9, 2021.

(56) References Cited

U.S. PATENT DOCUMENTS

| | | | | |
|---|---|---|---|---|
| 6,302,796 | B1 * | 10/2001 | Lebensfeld | F41G 3/2655 446/175 |
| 6,615,814 | B1 * | 9/2003 | Rice | F41B 11/723 124/71 |
| 7,730,881 | B1 * | 6/2010 | Pedicini | F04B 35/04 124/65 |
| 10,876,809 | B1 * | 12/2020 | Kopman | F41B 4/00 |
| 2006/0254572 | A1 * | 11/2006 | Hall | F41B 11/73 124/74 |
| 2008/0105245 | A1 * | 5/2008 | Cole | F41B 11/62 124/77 |
| 2009/0056693 | A1 * | 3/2009 | Pedicini | F41B 11/64 124/73 |
| 2009/0159060 | A1 * | 6/2009 | Newman | F41A 19/66 124/32 |
| 2009/0199834 | A1 * | 8/2009 | Skilling | F41B 11/721 124/71 |
| 2009/0241931 | A1 * | 10/2009 | Masse | F41B 11/71 124/76 |
| 2014/0272806 | A1 * | 9/2014 | Hunt | F41A 33/06 434/16 |
| 2014/0373823 | A1 * | 12/2014 | Stevens | F41B 11/51 124/56 |
| 2017/0010062 | A1 * | 1/2017 | Black | F41J 5/10 |

* cited by examiner

TOY PROJECTILE SHOOTER FIRING MODE ASSEMBLY AND SYSTEM

CROSS-REFERENCE TO RELATED APPLICATIONS

This application is a continuation of U.S. patent application Ser. No. 18/222,157, filed Jul. 14, 2023, which is a continuation-in-part of U.S. patent application Ser. No. 18/218,335 filed Jul. 5, 2023, now U.S. Pat. No. 11,986,739, which is a continuation-in-part of U.S. patent application Ser. No. 18/095,911 filed Jan. 11, 2023, now U.S. Pat. No. 11,813,537, which is a continuation-in-part of U.S. patent application Ser. No. 17/862,001 filed Jul. 11, 2022, now U.S. Pat. No. 11,759,717, which claims the benefit of U.S. Provisional Patent Application No. 63/220,343, filed on Jul. 9, 2021. U.S. patent application Ser. No. 18/095,911 also claims the benefit of U.S. Provisional Patent Application No. 63/409,582, filed on Sep. 23, 2022. U.S. patent application Ser. No. 18/222,157 also claims the benefit of U.S. Provisional Patent Application No. 63/522,368, filed on Jun. 21, 2023. All applications listed above are incorporated by reference in their entireties herein.

FIELD OF THE INVENTION

The present invention relates to a toy projectile shooter firing mode selection assembly and system.

BACKGROUND OF THE INVENTION

Blasters that shoot projectiles, such as gel-based balls, paint balls and the like can be utilized by people of all ages. However, the firing mechanisms or systems for the blasters or projectile shooters often require a user to pull the trigger each time a projectile is fired or the system allows the firing of multiple projectiles with the single pull of the trigger, but without the ability to easily switch back and forth. The present invention addresses these issues.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention, there is provided a toy projectile shooter that includes a housing defining a housing interior, a barrel, a trigger movable between a non-firing position and a firing position, a firing motor, a plunger sensor, a plunger disposed in the housing interior, and a shot firing mode system. The shot firing mode system is configured to activate the firing motor when the trigger is moved from the non-firing position to the firing position, move the plunger from a first plunger position to a second plunger position when the firing motor is activated, actuate the plunger sensor when the plunger is moved from the first plunger position to the second plunger position, bias the plunger from the second plunger position to the first plunger position after the plunger sensor is actuated, and deactivate the firing motor after the plunger sensor has been actuated a predetermined number of times. In a preferred embodiment, the plunger may include a hammer extending therefrom. The hammer is configured to actuate the plunger sensor when the plunger is moved from the first plunger position to the second plunger position. The toy projectile shooter may also include a trigger sensor and a microcontroller. The trigger sensor is configured to actuate upon movement of the trigger to the firing position and transmit a firing signal to the microcontroller upon actuation. The microcontroller is configured to activate the firing motor upon receipt of the firing signal. The microcontroller is configured to deactivate the firing motor after actuation of the plunger sensor the predetermined number of times.

In a preferred embodiment, the hammer extends through an opening or slot defined in a gearbox housing that houses the plunger. The shot firing mode system and toy projectile shooter may include a mode selection switch that is configured to toggle, switch or select between at least first and second firing modes. The first and second firing modes may include a multi-shot mode (as defined herein, multi-shot mode may include the firing of only a single shot) and an auto-shot mode where projectiles are fired continuously (as a result of the firing motor continuing to activate and rotate the subject gears) until the trigger is released. In a preferred embodiment, when the plunger sensor is actuated the plunger sensor may be configured to transmit a stop or shot fired signal. In multi-shot mode the shot firing mode system is configured to deactivate the firing motor after a predetermined number of shot fired signals have been transmitted. In the auto-shot mode the shot firing mode system is configured to deactivate the firing motor when the trigger is moved from the firing position to the non-firing position. In the auto-shot mode the shot firing mode system is configured to ignore the shot fired signals. In the auto-shot mode the plunger sensor is configured to not send a shot fired signal when the plunger sensor is actuated.

In a preferred embodiment, the plunger sensor includes a switch portion and a contact portion and the plunger sensor is actuated when the hammer contacts and moves the switch portion into contact with the contact portion. The shot firing mode system may be configured to toggle, switch or select between at least first and second firing modes when the toy projectile shooter 11 is moved from a first position to a second position. For example, when the toy projectile shooter is moved from horizontal position to a predetermined angle (the second position) or when the toy projectile shooter is shaken (causing it to move from a first position to a second position) one or more times. This movement may be sensed by sensor(s), gyroscope(s), accelerometer(s), other motion sensing device(s) or any combination thereof.

In a preferred embodiment, the shot firing mode system is configured to toggle, switch or select between at least first and second firing modes upon receiving a change firing mode command. For example, the change firing mode command may be transmitted from a pair of AR/MR/VR goggles or any type of eyewear that includes the capability of recognizing or receiving command inputs and transmit or receive data or signals as contemplated in the description herein (referred to as "eyewear" generally) or as a voice command. For example, a microphone on or associated with the toy projectile shooter, the microphone on the user's phone coupled with an app, a microphone on the eyewear or at any other location may be configured to receive voice commands and transmit the voice commands to the toy projectile shooter and/or the software/app, microcontroller or PCB thereof or related thereto.

In accordance with another aspect of the present invention, there is provided a method of using a toy projectile shooter that includes moving a trigger from a non-firing position to a firing position. Movement of the trigger to the firing position activates a firing motor. Activation of the firing motor moves a plunger from a first plunger position to a second plunger position. Movement of the plunger from the first plunger position to the second plunger position actuates a plunger sensor, After actuation of the plunger sensor, the plunger is biased from the second plunger position to the first plunger position and a first projectile is fired from a barrel. After actuation of the plunger sensor a predetermined number of times, the firing motor is deactivated. While the firing motor remains activated it continues to rotate the gear train, which includes at least a first gear that is associated with the plunger. Each revolution of the first gear results in the plunger sensor being actuated and a projectile or shot being fired.

In accordance with a first aspect of the present invention, there is provided a firing mode selection system for use in a toy projectile shooter, the firing mode selection system being configured to move a trigger from a non-firing position to a firing position thereby actuating a trigger sensor, wherein the trigger sensor transmits a firing signal to a microcontroller, wherein the microcontroller activates a firing motor upon receipt of the firing signal, wherein the firing motor moves a plunger from a first plunger position to a second plunger position, wherein movement of the plunger from the first plunger position to the second plunger position actuates a plunger sensor, wherein actuation of the plunger sensor causes a shot fired signal to be transmitted to the microcontroller, wherein a biased firing spring moves the plunger from the second plunger position to the first plunger position to fire a first projectile, wherein if the firing mode selection system is in a multi-shot mode, the microcontroller deactivates the firing motor after receiving a predetermined number of shot fired signals and firing the first projectile or a plurality of projectiles, and wherein if the firing mode selection system is in an auto-shot mode, the microcontroller does not deactivate the firing motor upon receiving the shot fired signals, or wherein if the firing mode selection system is in the auto-shot mode, the microcontroller does not deactivate the firing motor until the trigger is moved to the non-firing position.

In accordance with a first aspect of the present invention, there is provided a firing mode selection system for use in a toy projectile shooter that includes moving a trigger from a non-firing position to a firing position thereby actuating a trigger sensor, wherein the trigger sensor transmits a firing signal to a microcontroller, wherein the microcontroller activates a firing motor upon receipt of the firing signal, wherein the firing motor moves a plunger from a first plunger position to a second plunger position, wherein movement of the plunger from the first plunger position to the second plunger position actuates a plunger sensor, wherein if the firing mode selection system is in a multi-shot mode, actuating the plunger sensor causes a shot fired signal to be transmitted to the microcontroller, wherein if the firing mode selection system is in an auto-shot mode, wherein when the plunger sensor is actuated a stop signal is not transmitted to the microcontroller, wherein a biased firing spring is released and moves the plunger assembly from the second plunger position to the first plunger position to fire at least a first projectile, wherein if the firing mode selection system is in the multi-shot mode, the microcontroller deactivates the firing motor after receiving a predetermined number of shot fired signals, and wherein if the firing mode selection system is in an auto-shot mode, the microcontroller does not deactivate the firing motor until the trigger is moved to the non-firing position or the firing signal ceases.

In accordance with another aspect of the present invention, there is provided a firing mode selection system or method for use in or with a toy projectile shooter. The firing mode selection system or method includes moving a trigger from a non-firing position to a firing position thereby actuating a trigger sensor, which transmits a firing signal to a microcontroller. The microcontroller activates a firing motor upon receipt of the firing signal. The firing motor moves a plunger assembly from a first position to a second position. Movement of the plunger assembly from the first position to the second position closes a plunger switch. If the firing mode selection system is in a single-shot mode, closing the plunger switch causes a stop signal to be transmitted to the microcontroller. If the firing mode selection system is in an auto-shot mode, closing the plunger switch does not cause a stop signal to be transmitted to the microcontroller (i.e., closing the plunger switch does not cause anything to happen). Next, a biased firing spring is released, which moves the plunger assembly from the second position to the first position to fire a first projectile. If the firing mode selection system is in the single-shot mode, the microcontroller deactivates the firing motor within a predetermined time of receiving the stop signal. If the firing mode selection system is in the auto-shot mode, the microcontroller does not deactivate the firing motor until the trigger is moved to the non-firing position and/or the firing signal ceases (in which case, multiple projectiles are fired).

The present invention includes a mechanical device or sub-assembly for achieving one-pull, one-shot (semi-automatic), one-pull, multiple shots or fully automatic firing modes in or for a toy projectile shooter. Preferably, the present invention achieves semi and fully-automatic modes within a hand-sized toy projectile launcher (which may be referred to herein as the firing mode selection system). In a preferred embodiment, the present invention achieves the various shot modes while utilizing a relatively low processing draw on the printed circuit board that is part of the toy projectile shooter. The present invention may be utilized with blasters or toy projectile shooters such as those that fire spherical or other projectiles (such as the Surge 1.5 and GB2011 1.0, which fire gel-based balls referred to commercially as Gellets and are sold by GEL BLASTER®).

U.S. Publication No. 2023/0211239 (the "'239 publication") and U.S. patent application Ser. No. 18/218,335 (the "'335 application"), both of which are incorporated by reference herein in their entireties, teach blaster or toy projectile shooters that are part of a system for "video gamifying" a real-life paintball/gel-based projectile/combat experience using augmented reality. In a preferred embodiment, the present invention includes digitizing an outdoor/indoor blaster gameplay experience thereby providing a mixed reality video game experience through the use of augmented reality (AR), virtual reality (VR), and/or extended-reality (XR) eyewear (goggles, glasses, helmet, etc.) while also including the toy projectile shooters or blasters that shoot or fire actual projectiles. The toy projectile shooters discussed herein may be used in or incorporated into such a system. Any type of AR/VR/XR system or eyewear is within the scope of the present invention. For example, the system may connect or combine with Apple's (or others') AR glasses. The use of AR/VR/XR eyewear and the connection to the system, software application ("app"), etc. may provide for abilities or features for players or participants. For example, the eyewear may provide the ability to see where your teammates are through walls, around buildings, etc. The eyewear may provide the ability to see the health being lost by another participant as you shoot them, and/or see your own health stats at all times or as you are hit. Motion tracking or sensing components, sensors or reflectors on the blaster or other items allow the game to replace the look of the physical blaster or other item in the players hand. In other words, if a player has a pistol in the game, the player (and other players) will see a pistol in the AR/VR/XR eyewear and when the player upgrades to, for example, a bazooka, the gun will graphically change on the screen (e.g., similar to a first-person shooter game). For example, the virtual gun shown in AR/VR/XR on the eyewear can change from a pistol to a machine gun when the player upgrades to that gun. The eyewear preferably provides the ability to see and go get supply drops (e.g., weapons, health kit, shield, portions, etc.) in the physical world (e.g., around the yard, playing area, arena, etc.). Accelerometers, gyroscopes or other motion sensing devices can be included on or within the blaster or other physical item to track movement that can be digitized and displayed on the AR/VR/XR eyewear or on the app. The ability of the plunger sensor to count the number of projectiles or shots fired can be integrated into the system and utilized within the app or any other software associated with the system as necessary or desired. The various shot modes (e.g., first mode, second mode, etc.) may also be associated with the different types of may also be associated with the various virtual guns shown in AR/VR/XR on the goggles or eyewear. For example, if in the gaming system the user selects or is provided with a pistol, the software of the toy projectile shooter may toggle, switch or select to single-shot or fire mode. If the user selects or is provided with a machine gun, the software of the toy projectile shooter may toggle, switch or select to auto-shot or fire mode. If the user selects or is provided with a shot gun or other type of gun, the software of the toy projectile shooter may toggle, switch or select to a mode where multiple shots are fired with every trigger pull. Other modes are within the scope of the invention.

DETAILED DESCRIPTION OF THE PREFERRED EMBODIMENTS

Figure 1:
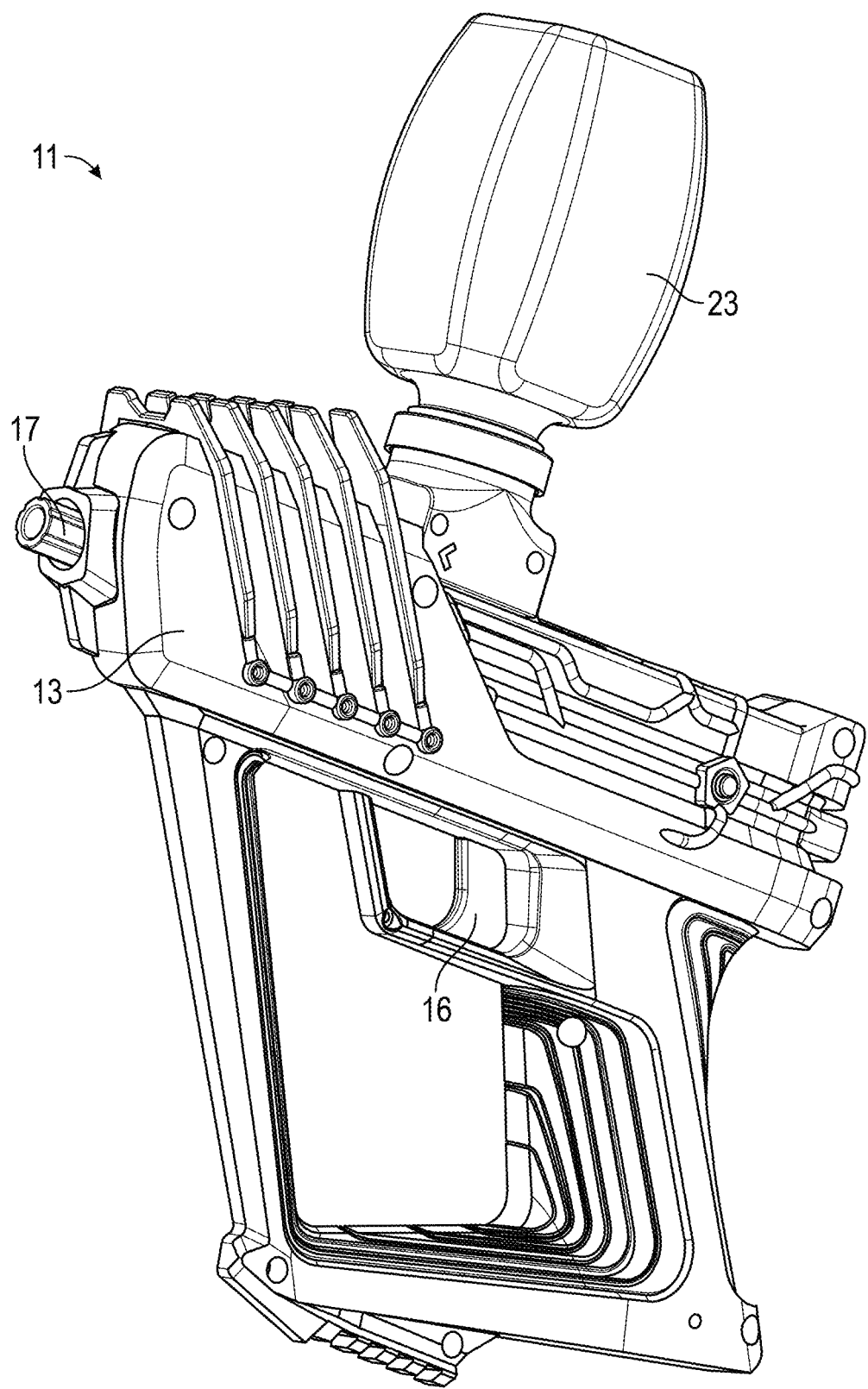
FIG. 1 is a perspective view of a toy projectile shooter that includes a firing mode selection system and assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 6:
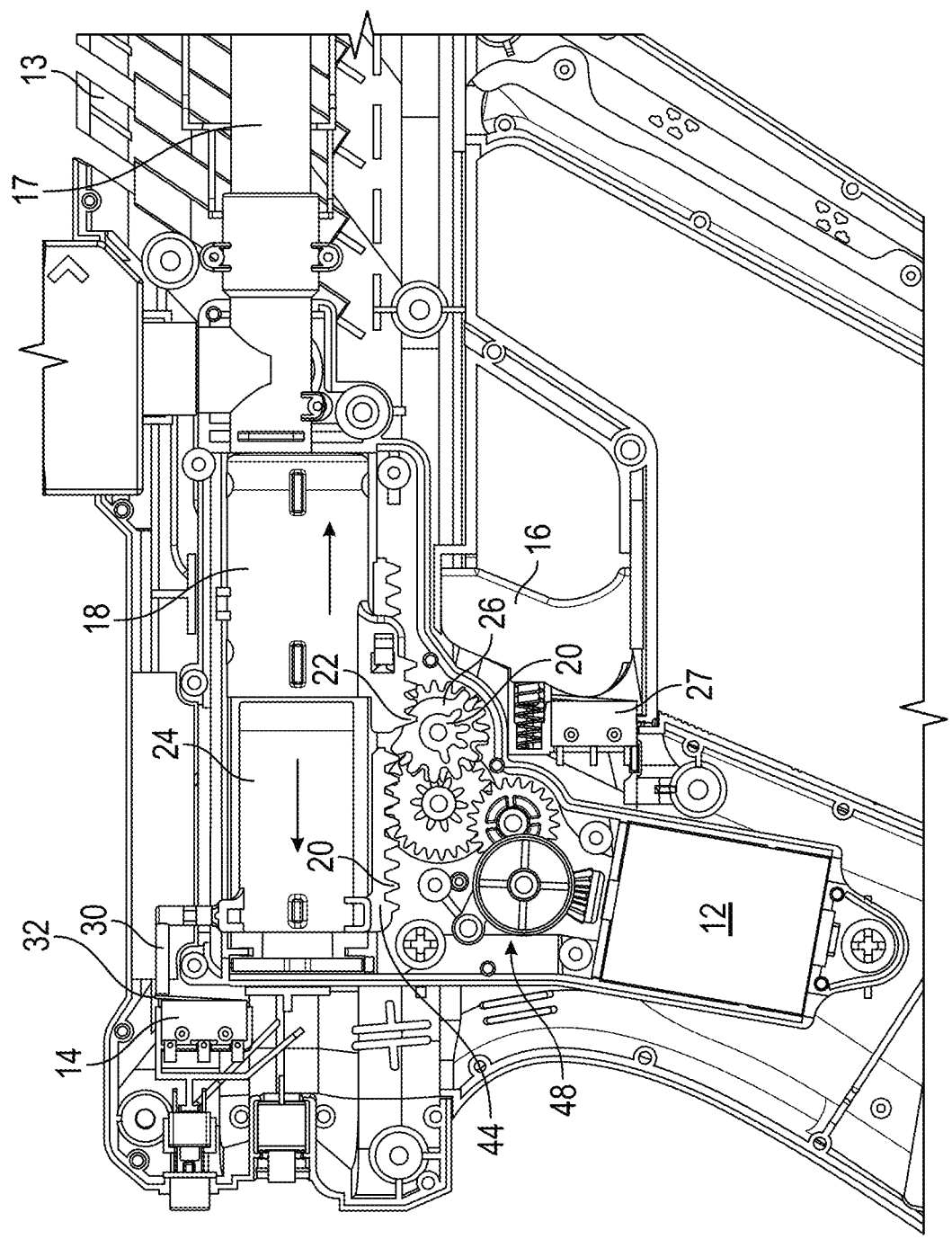
FIG. 6 is a side elevational view of a portion of the toy projectile shooter after the plunger sensor has been closed and actuated.
Figure 7:
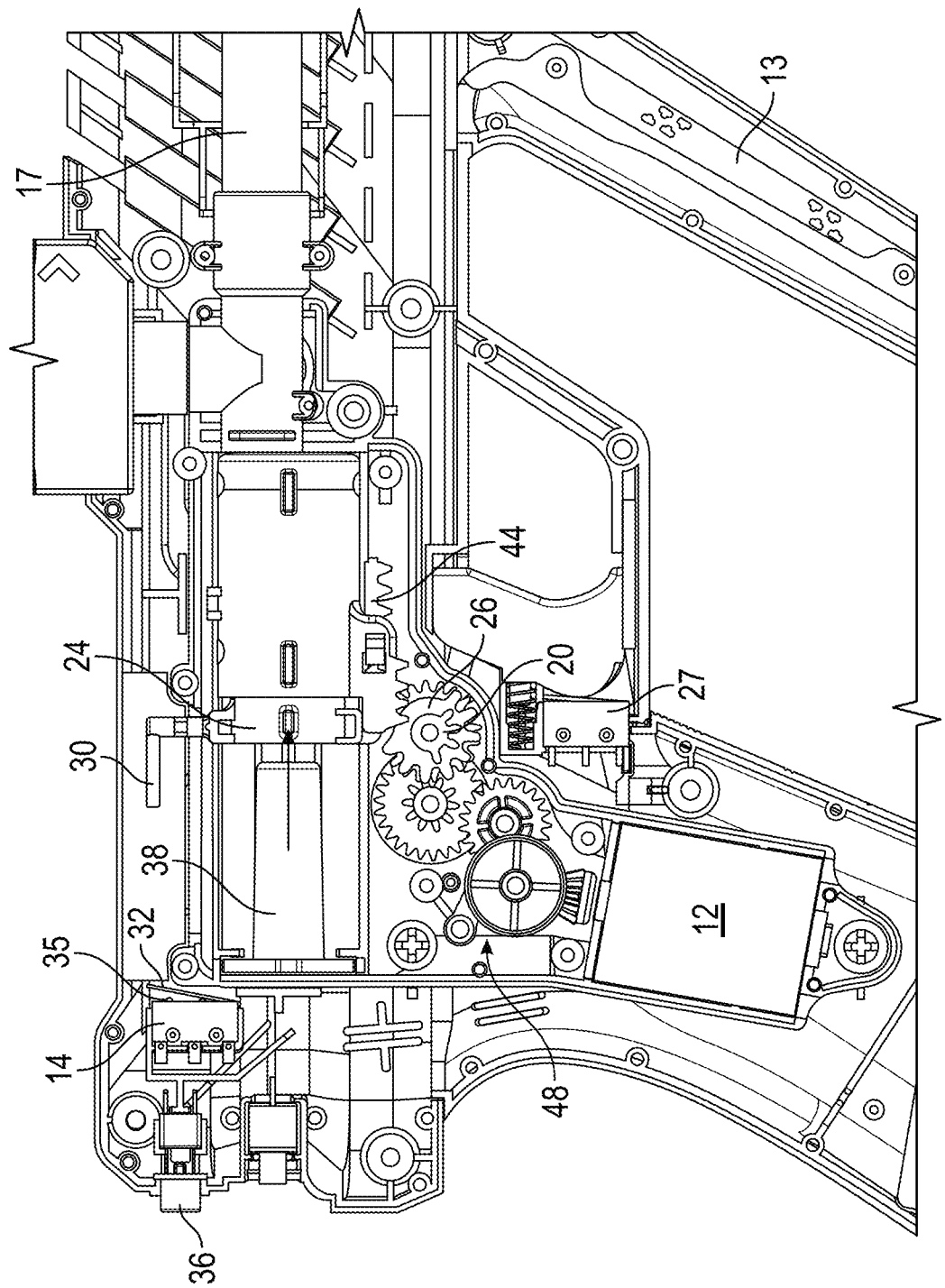
FIG. 7 is a side elevational view of a portion of the toy projectile shooter after a projectile has been fired.
Figure 8:
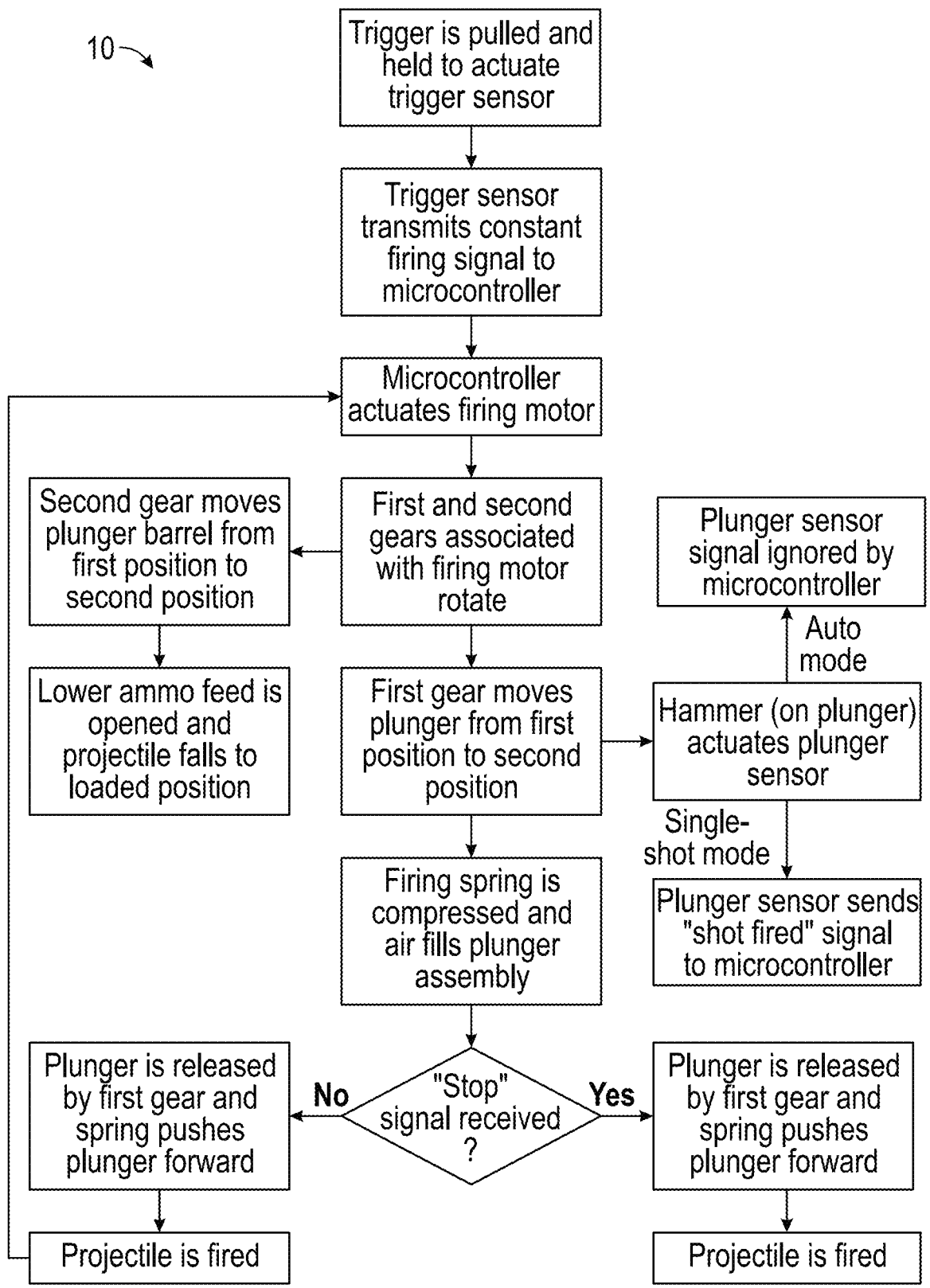
FIG. 8 is a flow chart that includes at least some of the steps of the firing mode selection system.

In a preferred embodiment, the present invention is directed to a firing mode selection assembly 10 and system that provides an at least partially mechanical method of selecting between two firing modes in a toy projectile shooter. The system and method preferably utilizes reduced PCB processing capacity compared to fully software-based solutions. FIGS. 1-7 shows at least a portion of the mechanical components within the toy projectile shooter 11 or blaster and FIG. 8 is a flow chart that includes at least some of the steps of the firing mode selection system.

Figure 2:
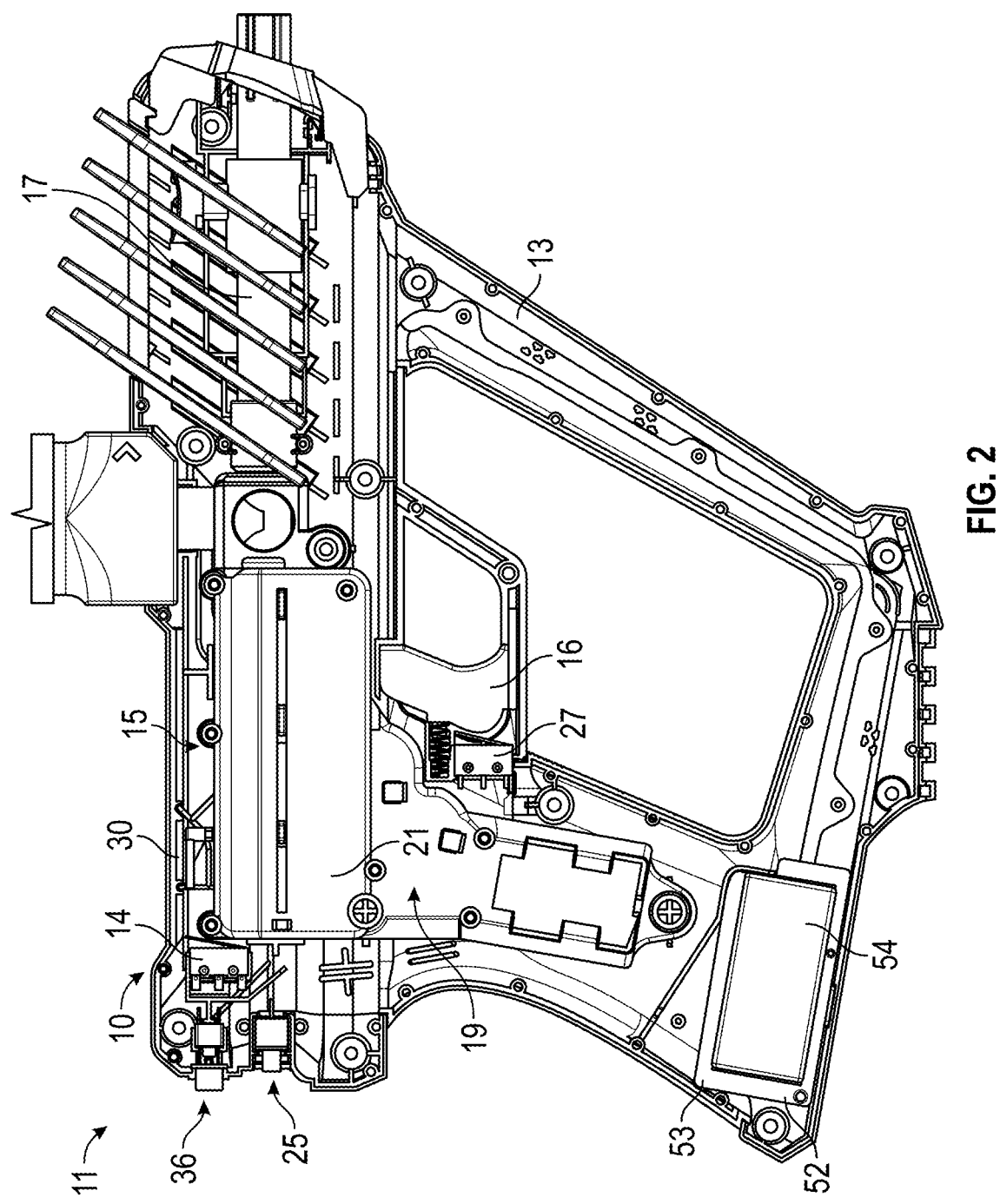
FIG. 2 is a side elevational view of the toy projectile shooter with a portion of the housing removed.

With reference to FIGS. 1-2, the toy projectile shooter 11 includes a housing 13 that defines a housing interior 15, a micro-switch or plunger sensor 14, a trigger 16, barrel 17, gearbox 19, gearbox housing 21 and a hopper 23, which holds projectiles to be fired from the barrel 17. FIG. 2 shows a portion of the housing 13 removed to expose the components located in the housing interior 15.

With reference to FIGS. 3-7, in a preferred embodiment, the toy projectile shooter 11 includes a spring retainer or plunger guide rod 38 and plunger assembly 40. The plunger assembly 40 preferably includes an impactor or plunger barrel 18 and a push rod or plunger 24. In a preferred embodiment, one or more firing springs (not shown) surround or surrounds at least a portion of the plunger guide rod 38 and are configured to push the plunger 24 and/or the plunger barrel 18 forwardly to fire a projectile, as discussed further below. The plunger 24 includes a rail or rack 44 that has a plurality of teeth 28 thereon that engages a first gear 26 that is actuated or rotated by the firing motor 12. The plunger barrel 18 includes a rail or rack 42 that has a plurality of teeth 22 thereon that engages a second gear 20 that is actuated or rotated by the firing motor 12. As shown in FIG. 2, the firing motor 12 includes a gear, such as a bevel gear 46 that actuates a gear train 48 that includes the first gear 26 and the second gear 20. In a preferred embodiment, the plunger 24 includes a push arm or hammer 30 extending upwardly therefrom and through a slot 50 defined in the gearbox housing 33. It will be appreciated that the first and second gears may be unitary and may be considered a single gear as they rotate together and engage racks 42 and 44. It will also be appreciated that in FIGS. 3-7, a portion of the housing behind the path of the hammer 30 has been omitted for ease of viewing of the hammer 30, and its movement between the first plunger position and the second plunger position.

In a preferred embodiment, as shown in FIG. 2, the toy projectile shooter 11 includes the plunger sensor 14 and a micro-switch or trigger sensor 27 that are both in electrical and/or data communication with a microcontroller 53 that is preferably located on or within the printed circuit board or PCB 52. In another embodiment, the microcontroller 53 may be disposed separately from the PCB 52. Preferably, the plunger sensor 14 and trigger sensor 27 are hinge lever switches that include a lever or switch portion 32 and a contact portion 35. However, this is not a limitation on the present invention, and any sensor or switch that may be activated by the action of the plunger 24 and/or the hammer 30 is within the scope of the present invention. For example, in another embodiment, the switch portion may be a button that moves axially to contact a contact portion and close the switch or actuate the plunger sensor. The toy projectile shooter 11 may also include a battery 54 for powering the device. It will be appreciated that the wires (for electrical or data communication) extending between the PCB 52 and other components have been omitted in the drawings.

In a preferred embodiment, when a user powers on the toy projectile shooter 11 that contains the firing mode selection system 10, the toy projectile shooter 11 is set to "single-fire mode" or semi-automatic mode (in another embodiment, the system may be set to auto-mode when the blaster is powered on). Switch 25 in the drawings is an exemplary on/off switch. Single fire mode may be indicated by a mode LED located anywhere on the projectile shooter 11 or blaster, and, for example, on the lower left side of the grip base blinking slowly (e.g., illuminated white). In this state, the software responsible for controlling the blaster's firing routines actively listens to two sources of input: (1) the trigger sensor 27 that engages or activates the firing motor 12, and (2) the plunger sensor 14 that informs the microcontroller 53 when a firing cycle is complete.

Figure 3:
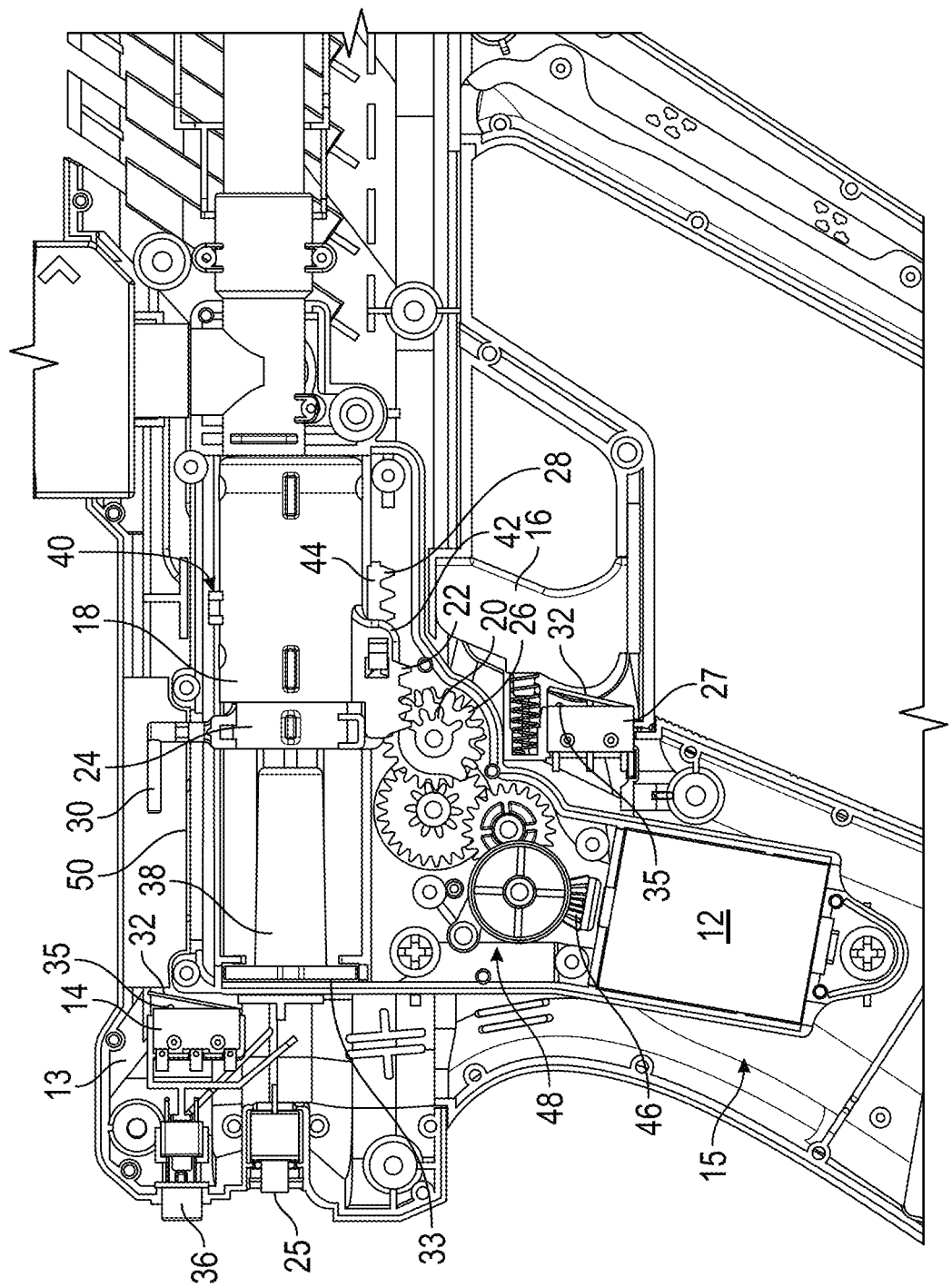
FIG. 3 is a side elevational view of the toy projectile shooter with a portion of the housing and the gearbox housing removed and showing the plunger assembly in the normal, resting or first position.
Figure 4:
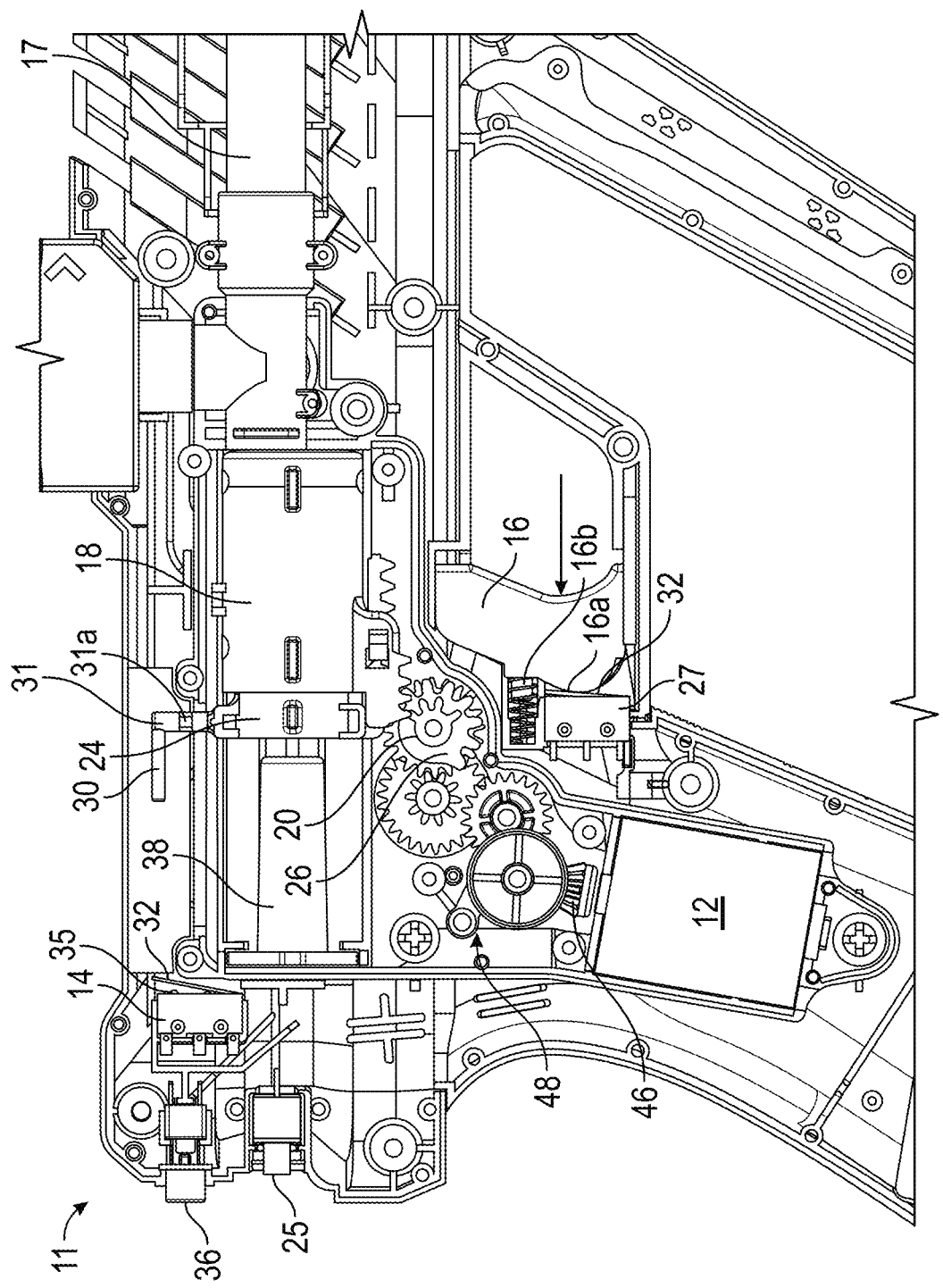
FIG. 4 is a side elevational view of a portion of the toy projectile shooter after the trigger has initially been pulled.

In a preferred embodiment, the single-fire mode of the firing mode selection system firing cycle includes the following steps. The user pulls the trigger 16, pushes a button or otherwise moves a trigger, button or switch from a non-firing position (FIG. 3) to a firing position (FIG. 4). When a rear portion 16a, protrusion or other component of the trigger 16 makes contact with or closes the trigger sensor 27 (or the trigger sensor is otherwise actuated), the trigger sensor activates, and a constant firing signal is transmitted to the microcontroller 53. As shown in FIGS. 3 and 4, in an exemplary embodiment, the rear portion 16a of the trigger 16 contacts and moves the switch portion 32 of the trigger sensor 27 rearwardly until it contacts the contact portion 35, thus closing the switch or actuating the trigger sensor 27. When the trigger sensor 27 is actuated, a signal is transmitted to the microcontroller 53 and the software onboard the microcontroller 53 instructs the system to activate or actuate the firing motor 12. The firing motor 12 spins or otherwise activates, thereby rotating, turning or actuating the gear train 48, which moves the plunger barrel 18 rearwardly a predetermined distance. This may be accomplished by the second gear 20, which is a part of the series of gears or gear train 48, that engages teeth 22 on the plunger barrel 18. The movement of the plunger barrel 18 the predetermined distance or from a first plunger barrel position to a second plunger barrel position opens the lower ammo feed and a projectile falls or moves into the loading position.

At approximately the same time as the plunger barrel 18 moves rearwardly, the inner piston or plunger 24, at least a portion of which extends into the plunger barrel 18 is engaged by the gear train 48 and also moves rearwardly a predetermined plunger barrel distance (or from a first plunger barrel position to a second plunger barrel position). This may be accomplished by the first gear 26, which is a part of the series of gears, and that engages teeth 28 on the plunger 24. The predetermined distance of movement of the plunger 24 is greater than the predetermined distance of movement of the plunger barrel 18 (compare FIGS. 5 and 6). The movement of the plunger assembly 40 (one or more of the plunger 24 and/or the plunger barrel 18) rearwardly compresses one or more firing spring(s) (not shown) and allows for the intake of a volume of air into the plunger assembly 40 (e.g., into the plunger barrel interior). Prior to the plunger 24 being released, the hammer 30 makes contact with the plunger sensor 14, and, in particular, the switch portion 32 of the plunger sensor 14, which is preferably located outside of the gearbox housing 21. As shown in FIG. 4, the hammer 30 may be positioned on an arm 31 that extends upwardly from the plunger 24 and through slot 50 or other opening defined in the gearbox housing 33. The arm 31 may include a guide 31a that extends outwardly from the arm 31 and is wider than slot 50 and moves along (in contact with or closely adjacent to) the upper wall of the gearbox housing 33. In another embodiment, the hammer may extend directly rearwardly from the plunger 24 and through an opening in the rear wall of the gearbox housing 33 (with the plunger sensor 14 positioned below where it is positioned in the figures).

Figure 5:
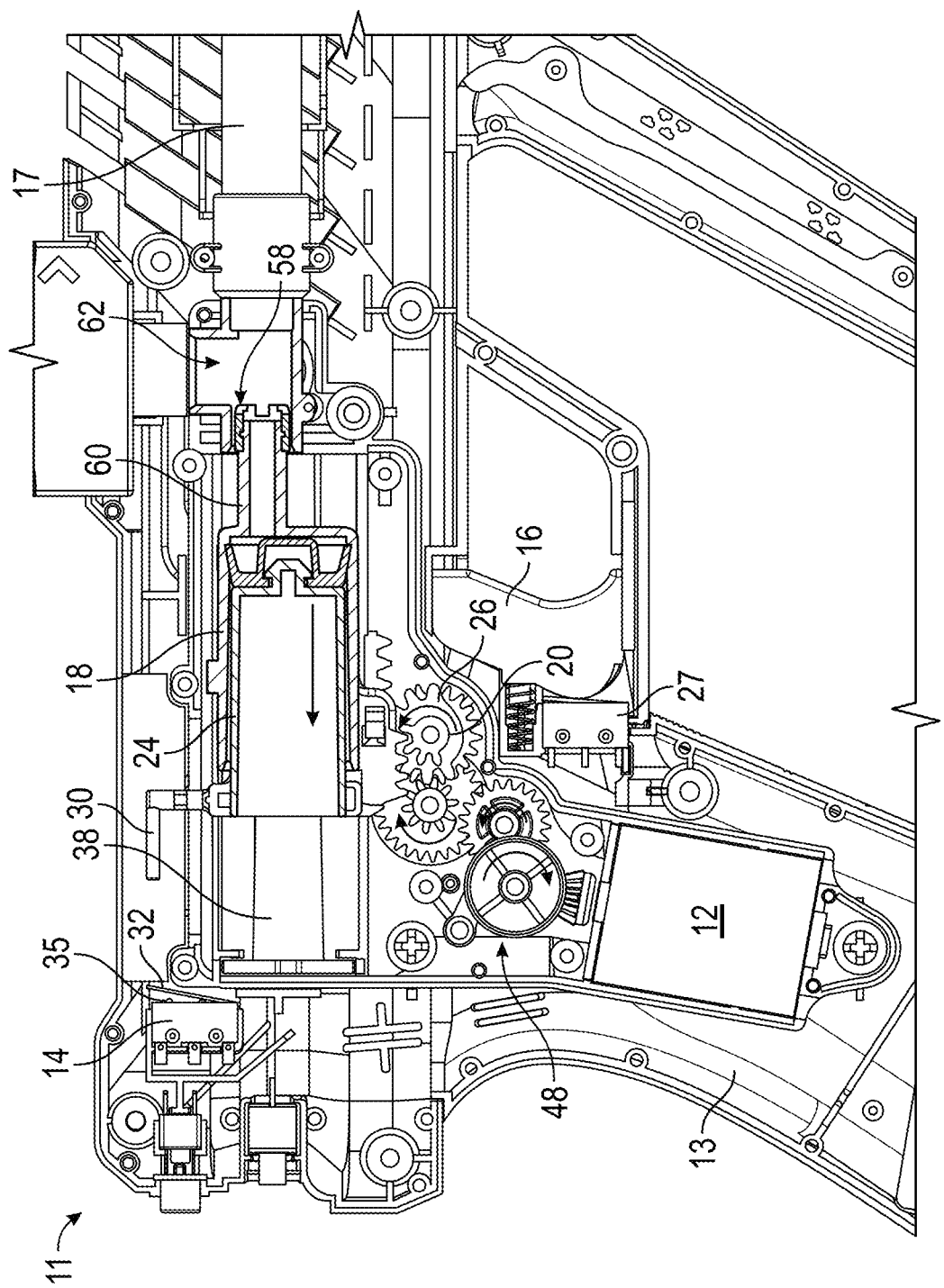
FIG. 5 is a side elevational view of a portion of the toy projectile shooter after the firing motor has been activated.

The movement of the plunger 24 and hammer 30 move the switch portion 32 far enough to close the switch (i.e., to actuate the plunger sensor 14). This contact or closing of the switch causes a signal to be transmitted from the plunger sensor 14 to the microcontroller 53, which the software recognizes as the completion of a single firing cycle. As a result, the power to the firing motor 12 is shut off or the firing motor is deactivated a predetermined amount of time after a single shot is fired, as set forth below. FIG. 4 shows the hammer 30 in the first or rest position (when the plunger 24 is in the first plunger position). FIG. 5 shows the hammer 30 between the first and second hammer positions or first and second plunger positions. FIG. 6 shows the hammer 30 in the second or contact position (when the plunger 24 is in the second plunger position) and when the hammer 30 has pushed the switch portion 32 into contact with the contact portion 35, to close the switch or actuate the plunger sensor 14 and cause the stop or "shot fired" signal to be transmitted.

FIG. 5 shows the front protrusion 60 on the plunger barrel 18. As the plunger barrel 18 moves rearwardly, the front protrusion 60 moves rearward of the projectile funnel 62, thus allowing a projectile to drop into loaded position within the barrel 17. As shown in FIG. 3, the second gear 20 only includes teeth partially circumferentially therearound. These teeth in combination with teeth 22 on plunger barrel 18 move the plunger barrel 18 rearwardly to allow the projectile to drop or move to the loaded position. As shown in FIG. 6, when second gear 20 has rotated far enough that the teeth on second gear 20 come out of contact with teeth 22 (at which point the projectile has entered the loaded position), the plunger barrel 18 is released and is biased back to the first plunger barrel position.

After the plunger barrel 18 has been released (as a result of disengagement of the first gear 26), the plunger 24 continues to move rearwardly (this may be a result of there being more teeth on the first gear 26 than on the second gear 20) until the hammer 30 actuates the plunger sensor 14 (e.g., pushing switch portion 32 against contact portion 35). In an exemplary embodiment, and as shown in the drawings, the second gear 20 includes four teeth and the first gear 26 includes eight teeth. At approximately the same time as the plunger sensor 14 is actuated, as shown in FIG. 7, the plunger 24 is released by the gearing (e.g., via disengagement of the first gear 26, which only includes teeth partially circumferentially therearound, from rack 44) and the loaded firing spring decompresses and pushes or pulls the plunger 24 forward. This action causes the volume of air in the plunger assembly to be compressed, which is then channeled to the barrel 17 via the plunger barrel nozzle 58 (FIG. 5). Next, the pressure of the compressed gas or air accelerates the projectile that is in the loaded position, and it is fired from the barrel 17. As discussed above, the firing motor 12 is then deactivated as a result of the signal from the plunger sensor 14 and the single-shot firing cycle is complete. The system then returns to its initial state where a single shot can be fired by pulling the trigger and starting the process over again. If the user continues to hold the trigger in the firing position, the software will ignore the signal from the trigger sensor 27 after the single shot has been fired.

In a preferred embodiment, to change between firing modes (e.g., single shot or automatic firing), the user actuates the switch (e.g., mode selector button 36, switch, etc.), which may be a button, rocker switch, physical momentary latching switch on the rear of the toy projectile shooter, etc. When the user switches to automatic or auto-fire mode, the plunger sensor 14 is deprioritized or ignored by the microcontroller software and the trigger sensor 27 is prioritized for firing. As discussed above, in single-fire mode, no matter how long the user maintains the trigger in the firing position (pulled in), the software ignores or deprioritizes the trigger sensor signal (after the initial or first shot) in favor of the plunger sensor 14 for cycle timing, which provides for only a single shot. In an exemplary embodiment, the change in mode to auto-fire is indicated by the mode LED, indicator or light being illuminated solid white. Any other indication is within the scope of the present invention (e.g., fast blinking, slow blinking, more or less intensity, on or off, one light versus multiple lights, etc.).

In a preferred embodiment, the automatic or auto-mode of the firing mode selection system includes the following steps. As shown in FIG. 4, the user pulls the trigger 16, pushes a button or otherwise moves a trigger, button or switch from a non-firing position to a firing position. When the rear portion 16a of the trigger 16 makes contact with the trigger sensor 27 (or the trigger sensor is otherwise actuated), the trigger sensor activates, and a constant firing signal is transmitted to the microcontroller 53. The software onboard the microcontroller 53 instructs the system to activate or actuate the firing motor 12.

Next, as shown in FIG. 5, the firing motor 12 spins or otherwise activates, thereby rotating, turning or actuating the series of gears or gear train 48, which moves the plunger barrel 18 rearwardly a plunger barrel predetermined distance (from the first plunger barrel position to the second plunger barrel position), which, as described above, opens the lower ammo feed or projectile funnel 62 and a projectile falls or moves into the loaded position.

At approximately the same time as the plunger barrel 18 moves rearwardly, the inner piston or plunger 24 is engaged by the gear train 48 and also moves rearwardly a plunger predetermined distance (or from the first plunger position to the second plunger position). As described above, the movement of the plunger 24 rearwardly compresses or tensions the firing spring and allows for the intake of a volume of air into the plunger assembly 40. Prior to the inner piston or plunger 24 being released, the hammer 30 makes contact with the plunger sensor 14 and closes the switch, as shown in FIG. 6. However, the closing of the switch is ignored or is not used by the software. In other words, either a signal is not transmitted by the plunger sensor 14 or it is ignored by the microcontroller 53 due to the system being in auto-mode.

At approximately the same time as the plunger sensor 14 is actuated, the plunger 24 is released by the gearing (e.g., the first gear 26) and the loaded or biased firing spring decompresses and pushes or pulls the plunger 24 forward (after the second gear 20 has released the plunger barrel 18) as shown in FIG. 7. This action causes the volume of air in the plunger assembly 40 to be compressed, which is then channeled to the barrel 17 via the plunger barrel nozzle 58. Next, the pressure of the compressed gas or air accelerates the projectile that is in the loaded position and it is fired from the barrel 17.

Next, as long as the trigger 16 is maintained in the firing position (and the trigger sensor 27 continues to transmit the firing signal to the microcontroller 53), the cycle or process repeats and further projectiles are fired. It will be appreciated that as the cycle repeats, the firing motor 12 continues to actuate and the first and second gears 26 and 20 continue to rotate. As a result, the plunger barrel 18 and plunger 24 continue to cycle between moving rearwardly and being propelled or moved forwardly to fire another projectile. When the user releases the trigger 16 (which is biased from the firing position to the non-firing position, e.g., via a spring 16b) or otherwise moves the trigger, button or switch to the non-firing position, the auto-firing cycle stops or completes, the firing motor 12 is deactivated and the system returns to its initial readied state.

In short, when the firing mode selection system 10 is in the single-shot firing mode, the microcontroller 53 is programmed to deactivate the firing motor 12 or not reactivate the firing motor 12 after it receives a "stop" signal from the plunger sensor 14 (even if the trigger 16 is held in the firing position and the trigger sensor 27 continues to send the firing signal) and when the firing mode selection system 10 is in the auto-shot firing mode, the microcontroller 53 is programmed to receive the continuous firing signal from the trigger sensor 27 and ignore the "stop" signal from the plunger sensor 14, thus allowing the firing motor 12 to stay activated until the trigger 16 moves to the non-firing position, thus stopping the transmission of the constant firing signal from the trigger sensor 27. When the firing mode selection system 10 is in the multi-shot firing mode (which includes the possibility of a single shot and is described further below), the microcontroller 53 is programmed to deactivate the firing motor 12 or not reactivate the firing motor 12 after it receives a predetermined number of "stop" or "shot fired" signal(s) from the plunger sensor 14 (even if the trigger 16 is held in the firing position and the trigger sensor 27 continues to send the firing signal). FIG. 8 includes a flowchart that shows at least some of the steps described above and that are included in the firing mode selection system 10.

It will be appreciated that other firing modes may be programmed into the software and controlled by the microcontroller. During use, the system may count the number of shots or projectiles fired, based on the number of times that the plunger sensor 14 is actuated while the trigger 16 is held on the firing position (and the trigger sensor 27 continues to send the firing signal). Using this capability, the system may include a multi-shot mode that includes the firing of one, two, three or more projectiles. Using the firing of two projectiles as an example, in this mode, pulling the trigger results in two projectiles being fired (whether the trigger is pulled and immediately released or whether it is held in the firing position). After actuation of the trigger sensor 27, the system counts two actuations or cycles of the plunger sensor 14 (as a result of two "shot fired" signals being transmitted from the plunger sensor 14 to the microcontroller) and then stops firing. If the trigger 16 is held on the firing position after two projectiles have been fired, the firing signal is ignored, similar to single-shot mode discussed above. This may be done for the firing of any number of projectiles. If the multi-shot mode is the firing of a single projectile, even if the user continues to hold trigger in the firing position (where the trigger sensor transmits a constant firing signal), only one shot will be fired because the system and/or microcontroller knows to stop firing after one plunger sensor actuation. If the multi-shot mode is the firing of several projectiles (e.g., three), if the user releases the trigger and it is biased back to the non-firing position (where the trigger sensor stops transmitting the constant firing signal) prior to all three shots being fired, the firing motor will continue activation and revolving and rotating the gears until all three shots have been fired. It will be appreciated that the system may include more than two firing modes. This may be accomplished by pushing the mode selector button a predetermined number of times (e.g., once for auto-mode and twice for triple-shot mode and a third time to return to single-shot mode). This may all be software controlled.

The counting of projectiles fired by the plunger sensor may also be used to notify the system or user that the projectile shooter 11 needs to be reloaded or refilled. This may be done physically by reloading the hopper with physical projectiles. In another embodiment in which the toy projectile shooter 11 or blaster is part of a system as described, e.g., in the '239 publication or the '335 application, after counting a predetermined number of shots (whether with a single pull of the trigger or multiple pulls of the trigger), the system may signal the user to virtually reload. For example, by orienting the blaster in a certain way, such as pointing the barrel vertically or shaking the blaster, such that an accelerometer on board the blaster (and a part of the same signal network as the other sensors) signals the microcontroller 53 that a "reloading action" has occurred. Therefore, the plunger sensor 14 may be utilized for shot awareness (e.g., shot count) and shot control (e.g., stopping the firing motor after a predetermined number of shots have been fired).

In a preferred embodiment of the present invention, functionality is implemented as software executing on a server that is in connection, via a network, with other portions of the system, including databases and external services. The server comprises a computer device capable of receiving input commands, processing data, and outputting the results for the user. Preferably, the server consists of RAM (memory), hard disk, network, central processing unit (CPU). It will be understood and appreciated by those of skill in the art that the server could be replaced with, or augmented by, any number of other computer device types or processing units, including but not limited to a desktop computer, laptop computer, mobile or tablet device, or the like. Similarly, the hard disk could be replaced with any number of computer storage devices, including flash drives, removable media storage devices (CDs, DVDs, etc.), or the like.

The network can consist of any network type, including but not limited to a local area network (LAN), wide area network (WAN), and/or the internet. The server can consist of any computing device or combination thereof, including but not limited to the computing devices described herein, such as a desktop computer, laptop computer, mobile or tablet device, as well as storage devices that may be connected to the network, such as hard drives, flash drives, removable media storage devices, or the like.

The storage devices (e.g., hard disk, another server, a NAS, or other devices known to persons of ordinary skill in the art), are intended to be nonvolatile, computer readable storage media to provide storage of computer-executable instructions, data structures, program modules, and other data for the mobile app, which are executed by CPU/processor (or the corresponding processor of such other components). The various components of the present invention, are stored or recorded on a hard disk or other like storage devices described above, which may be accessed and utilized by a web browser, mobile app, the server (over the network), or any of the peripheral devices described herein. One or more of the modules or steps of the present invention also may be stored or recorded on the server, and transmitted over the network, to be accessed and utilized by a web browser, a mobile app, or any other computing device that may be connected to one or more of the web browser, mobile app, the network, and/or the server.

References to a "database" or to "database table" are intended to encompass any system for storing data and any data structures therein, including relational database management systems and any tables therein, non-relational database management systems, document-oriented databases, NoSQL databases, or any other system for storing data.

Software and web or internet implementations of the present invention could be accomplished with standard programming techniques with logic to accomplish the various steps of the present invention described herein. It should also be noted that the terms "component," "module," or "step," as may be used herein, are intended to encompass implementations using one or more lines of software code, macro instructions, hardware implementations, and/or equipment for receiving manual inputs, as will be well understood and appreciated by those of ordinary skill in the art. Such software code, modules, or elements may be implemented with any programming or scripting language such as C, C++, C#, Java, Cobol, assembler, PERL, Python, PHP, or the like, or macros using Excel or other similar or related applications with various algorithms being implemented with any combination of data structures, objects, processes, routines or other programming elements.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A toy projectile shooter comprising:
a housing defining a housing interior,
a barrel,
a trigger, wherein the trigger is movable between a non-firing position and a firing position,
a firing motor,
a plunger sensor, wherein when the plunger sensor is actuated the plunger sensor is configured to transmit a shot fired signal,
a plunger disposed in the housing interior, and
a shot firing mode system that includes at least a multi-shot mode and an auto-shot mode, wherein in the multi-shot mode the shot firing mode system is configured to
    activate the firing motor when the trigger is moved from the non-firing position to the firing position,
    move the plunger from a first plunger position to a second plunger position when the firing motor is activated,
    actuate the plunger sensor when the plunger is moved from the first plunger position to the second plunger position,
    bias the plunger from the second plunger position to the first plunger position to fire a projectile, and
    deactivate the firing motor after the plunger sensor has been actuated a predetermined number of times,
    wherein in the auto-shot mode the shot firing mode system is configured to deactivate the firing motor when the trigger is moved from the firing position to the non-firing position, and wherein in the auto-shot mode the shot firing mode system is configured to ignore the shot fired signals.

2. The toy projectile shooter of claim 1 wherein the plunger includes a hammer extending therefrom, wherein the hammer is configured to actuate the plunger sensor when the plunger is moved from the first plunger position to the second plunger position.

3. The toy projectile shooter of claim 2 wherein the plunger sensor includes a switch portion and a contact portion, wherein the plunger sensor is actuated when the hammer contacts and moves the switch portion into contact with the contact portion.

4. The toy projectile shooter of claim 1 further comprising a trigger sensor and a microcontroller, wherein the trigger sensor is configured to actuate upon movement of the trigger to the firing position, wherein the trigger sensor is configured to transmit a firing signal to the microcontroller upon actuation, wherein the microcontroller is configured to activate the firing motor upon receipt of the firing signal, wherein the microcontroller is configured to deactivate the firing motor after actuation of the plunger sensor the predetermined number of times.

5. The toy projectile shooter of claim 2 wherein the hammer extends through an opening defined in a gearbox housing that houses the plunger.

6. The toy projectile shooter of claim 1 wherein the shot firing mode system includes a mode selection switch that is configured to select between the multi-shot mode and the auto-shot mode.

7. The toy projectile shooter of claim 1 wherein the shot firing mode system is configured to select between at least first and second firing modes when the toy projectile shooter is moved from a first position to a second position.

8. The toy projectile shooter of claim 1 wherein the shot firing mode system is configured to select between at least first and second firing modes upon receiving a change firing mode command.

9. The toy projectile shooter of claim 1 wherein the predetermined number of times is one.

10. The toy projectile shooter of claim 1 wherein the predetermined number of times is more than one.

11. A toy projectile shooter comprising:
a housing defining a housing interior,
a barrel,
a trigger, wherein the trigger is movable between a non-firing position and a firing position,
a firing motor,
a plunger sensor, wherein when the plunger sensor is actuated the plunger sensor is configured to transmit a shot fired signal,
a plunger disposed in the housing interior, and
a shot firing mode system that includes at least a multi-shot mode and an auto-shot mode, wherein in the multi-shot mode the shot firing mode system is configured to
    activate the firing motor when the trigger is moved from the non-firing position to the firing position,
    move the plunger from a first plunger position to a second plunger position when the firing motor is activated,
    actuate the plunger sensor when the plunger is moved from the first plunger position to the second plunger position,
    bias the plunger from the second plunger position to the first plunger position to fire a projectile, and
    deactivate the firing motor after the plunger sensor has been actuated a predetermined number of times,
wherein in the auto-shot mode the shot firing mode system is configured to deactivate the firing motor when the trigger is moved from the firing position to the non-firing position, and wherein in the auto-shot mode the plunger sensor is configured to not send a shot fired signal when the plunger sensor is actuated.

12. A toy projectile shooter comprising:
a housing defining a housing interior,
a barrel,
a trigger, wherein the trigger is movable between a non-firing position and a firing position,
a firing motor,
a plunger sensor,
a plunger disposed in the housing interior, and
a shot firing mode system configured to
activate the firing motor when the trigger is moved from the non-firing position to the firing position,
move the plunger from a first plunger position to a second plunger position when the firing motor is activated,
actuate the plunger sensor when the plunger is moved from the first plunger position to the second plunger position,
bias the plunger from the second plunger position to the first plunger position to fire a projectile, and
deactivate the firing motor after the plunger sensor has been actuated a predetermined number of times,
wherein the shot firing mode system is configured to select between at least first and second firing modes upon receiving a change firing mode command, and wherein the change firing mode command is transmitted from eyewear or as a voice command.

* * * * *